United States Patent

Hanlon

[11] Patent Number: 5,106,146
[45] Date of Patent: Apr. 21, 1992

[54] VEHICLE WINDOW WEATHERSTRIP

[76] Inventor: Michael J. Hanlon, 31334 Iroquois, Warren, Mich. 48093

[21] Appl. No.: 692,445

[22] Filed: Apr. 24, 1991

[51] Int. Cl.⁵ .................................. B60J 9/00
[52] U.S. Cl. ........................ 296/154; 49/476
[58] Field of Search .............. 296/146, 154, 213; 49/476, 480, 496, 495

[56] References Cited

U.S. PATENT DOCUMENTS

| | | | |
|---|---|---|---|
| 2,226,615 | 12/1940 | Killen | 49/462 |
| 2,737,412 | 3/1956 | Smith et al. | 49/476 |
| 2,813,748 | 11/1957 | Panik | 49/480 |
| 2,944,930 | 8/1961 | Cromwell | 49/496 X |
| 3,596,980 | 8/1971 | Cadion | 296/154 |
| 3,641,707 | 2/1972 | Kellos | 49/462 |
| 4,575,147 | 3/1986 | Ui et al. | 296/154 |
| 5,038,521 | 8/1991 | Anorzejewski et al. | 49/496 X |

FOREIGN PATENT DOCUMENTS

| | | | |
|---|---|---|---|
| 634860 | 9/1936 | Fed. Rep. of Germany | 49/495 |
| 2211896 | 9/1973 | Fed. Rep. of Germany | 49/477 |
| 0053267 | 3/1987 | Japan | 296/146 |
| 0225416 | 10/1987 | Japan | 296/146 |

*Primary Examiner*—Dennis H. Pedder
*Attorney, Agent, or Firm*—Basile and Hanlon

[57] ABSTRACT

A vehicle door window weatherstrip is mountable in a vehicle having a frame surrounding at least a portion of an upwardly and dowwardly movable window. The weatherstrip is formed of a one-piece body having a frame mounting portion engageable with the vehicle frame, a movable lip integral with the frame mounting portion and normally extending outward from the frame beyond the exterior of the vehicle window, and a deformable portion integral with the lip and deformable upward upon engagement with the top edge of an upwardly movable window. During such deformation of the deformable portion of the weatherstrip body, the lip moves from the normal outwardly extending position which defines a water channel with the adjacent portion of the vehicle frame when the deformable portion is in a normal un-deformed condition to a downward extending position in substantial registry with the exterior surface of the window. In one embodiment, a hollow channel is formed in the deformable portion of the weatherstrip body. In another embodiment, the deformable portion comprises a solid portion having a window engaging surface formed on one side and a frame engaging surface formed on the other side which is spaced from the vehicle frame in a normal, un-deformed condition. A planar reinforcement strip may be disposed within the lip of the weatherstrip body to provide rigidity to the lip when the lip is in the extended, rain channel forming position.

4 Claims, 2 Drawing Sheets

VEHICLE WINDOW WEATHERSTRIP

BACKGROUND OF THE INVENTION

1. Field of the Invention

The present invention relates, in general, to vehicles and, more specifically, to weatherstrips for sealing the edges of a window within a vehicle frame.

2. Description of the Art

A weatherstrip is employed on vehicles, such as automobiles, trucks, etc., to seal the edges of a movable window to a surrounding vehicle roof frame or vehicle door window frame. Such weatherstrips, which are typically formed of a rubber or other elastomeric material, are mounted in the roof frame or door window frame to resiliently engage the edges of the door window when the window is moved to its fully raised position. Such weatherstrips provide a tight seal about the edges of the window which prevents the entry of outside elements, such as air, water and noise, into the interior of the vehicle.

For fuel economy reasons, the trend in current automotive design is to more aerodynamic vehicles having less wind resistance. This has resulted in vehicles having highly curved roof-to-door surfaces. Older vehicle designs frequently employed a rain gutter in the form of a channel member attached to the side edge of the vehicle roof immediately above each door opening. Such rain gutters or channels collected water flowing off of the roof and diverted the water away from the window opening to prevent entry of the water into the interior passenger compartment when the window was not in a fully raised position. However, the use of such rain gutters increased the cost of the vehicle since they are a separate member requiring additional assembly operations. Such rain gutters also increased drag or wind resistance on the vehicle.

U.S. Pat. No. 2,737,412 illustrates a typical rain gutter mounted on the edge of a vehicle roof structure immediately above the window opening. This patent also discloses a conventional weatherstrip seal mounted to the roof structure for engaging the top edge of the vehicle window when the vehicle window is moved to a fully raised or up position.

However, due to the aerodynamic design of current vehicles, such separate rain gutters have fallen into disfavor such that most vehicles manufactured today do not include a rain gutter or any other provision for diverting water flowing off of the vehicle roof away from the door windows. Thus, such water can easily enter the interior passenger compartment if the window is not in its fully raised position engaged with the window weatherstrip seal. This problem is further aggravated by the highly curved roof-to-door structures of current vehicles in which the upper edge of the door or window extends partially into the vehicle roof structure thereby placing a portion of the interior passenger compartment directly below the top portion of the window opening so as to allow water to easily enter the passenger compartment when the window is not in its fully raised position.

Thus, it would be desirable to provide a vehicle weatherstrip seal which prevents the entry of water into the interior passenger compartment of such vehicles when a movable side window is not in its fully raised position. It would also be desirable to provide such a weatherstrip seal which is easily incorporated into existing door window and vehicle roof constructions without any modification thereto. It would also be desirable to provide a window weatherstrip seal which diverts water from the vehicle roof away from the window in addition to functioning as a seal to prevent the entry of air and water into the interior passenger compartment when the window is not fully raised and engaged with the weatherstrip seal.

SUMMARY OF THE INVENTION

The present invention is a vehicle window weatherstrip which is mountable in a vehicle having a frame surrounding at least a portion of an upwardly and downwardly movable window.

In a preferred embodiment, the window weatherstrip comprises a one-piece body having a frame mounting portion which is engageable with the vehicle frame for mounting the body to the vehicle frame. A movable lip is integrally formed with the frame mounting portion of the body and extends outward from the frame mounting portion beyond the exterior of the vehicle frame and the adjacent vehicle window.

A deformable portion is integrally formed with the lip in the body and is deformable upward upon engagement with the top edge of an upwardly movable vehicle window. The lip, which is in a normal outward extending position defining a water channel with the adjacent vehicle frame when the deformable portion of the body is in a normal, un-deformed condition spaced from a downwardly positioned window, moves to a substantially downward extending position in registry with the exterior surface of the top edge of the window to aid in sealing the top edge of the window to the surrounding frame.

In a preferred embodiment, the deformable portion of the body comprises a window edge engaging surface which is normally spaced from the vehicle frame when the window is downwardly spaced from the body of the weatherstrip and is movable toward the frame under engagement with an upwardly movable window. In one embodiment, the deformable portion of the body includes a hollow channel extending through the body between the window engaging surface and a spaced, frame engaging surface.

Preferably, the window engaging surface of the deformable portion of the body and a lower surface of the lip are formed as a continuous, linear, integral surface. In an alternate embodiment, an outwardly extending boss or projection is formed on the body at the juncture of the lip and deformable portions of the body. The boss is sandwiched between the top edge of the window and the vehicle frame as the vehicle window moves to the fully raised position to aid in forming a complete weatherproof seal about the top edge of the window as well as providing a twisting action which imparts a force on the leading edge of the lip to maintain the lip in positive engagement with the exterior surface of the window.

In another embodiment, a thin, planar reinforcement strip is disposed within the lip of the body of the weatherstrip. The planar reinforcement strip provides added rigidity to the lip when the lip is in its outwardly extending position to prevent movement of the lip during movement of the vehicle as well as any resulting noise from such movement of the lip caused by air flowing over the lip. The planar reinforcement also maintains the lip in substantial contact with the top edge of the vehicle window along the full length of the lip when the lip moves to its downwardly extending position in contact with the exterior surface of the window.

The unique weatherstrip seal of the present invention uniquely provides a dual function of forming a conventional seal about the top edge of a vehicle window when the window is in the raised position engaging a surrounding vehicle frame as well as acting as a rain channel or gutter to divert water flowing off of the roof away from the window opening when the vehicle window is not in the fully raised position to prevent the entry of water into the interior passenger compartment of the vehicle. The weatherstrip seal of the present invention provides such dual functions without requiring any modification to the existing vehicle window frame or roof structure. The pivotal movement of the lip which forms the rain channel or gutter in the raised position to the downward extending position in contact with the top edge of the window when the window is in its fully raised position decreases wind resistance during movement of the vehicle as well as affording a pleasing, aesthetic aerodynamic appearance for the vehicle. Finally, the weatherstrip seal of the present invention provides such dual functions without substantially increasing the cost of the weatherstrip seal over prior weatherstrips which provide only a seal function.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
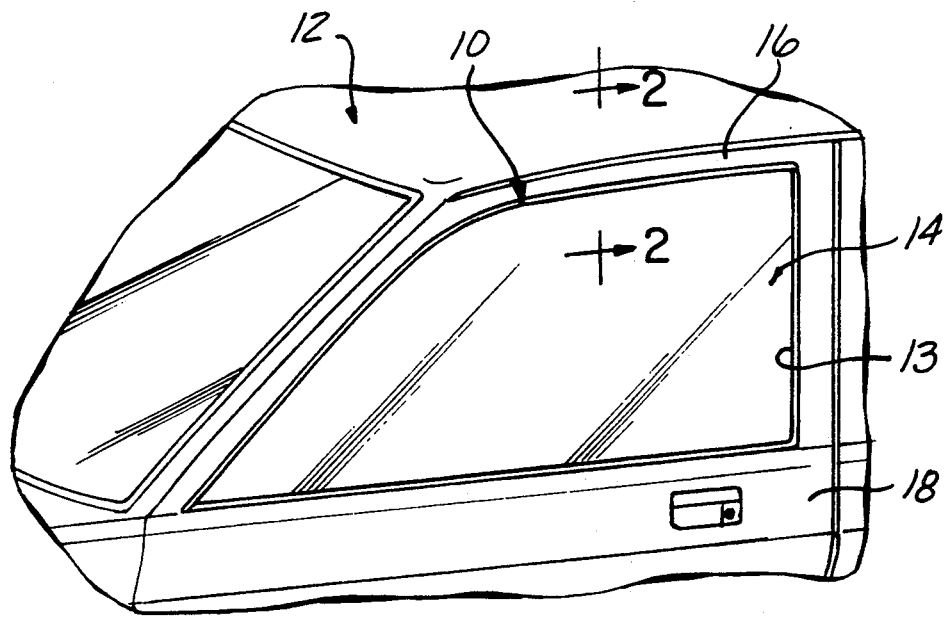
FIG. 1 is a partial perspective view of a vehicle showing a vehicle door window and surrounding vehicle frame structure.

Referring now to the drawing, and to FIG. 1 in particular, there is illustrated a vehicle door window weatherstrip 10 mountable in a vehicle 12 having a frame surrounding at least a portion of an upwardly and downwardly movable window 14. The weatherstrip 10 functions to seal the upper edge of the window 14 to the frame 16 of the vehicle 12 surrounding the window 14 as well as the added feature of functioning as a rain gutter or channel to divert water away from the window opening 13 when the window 14 is not in its fully raised or up position.

Figure 2:
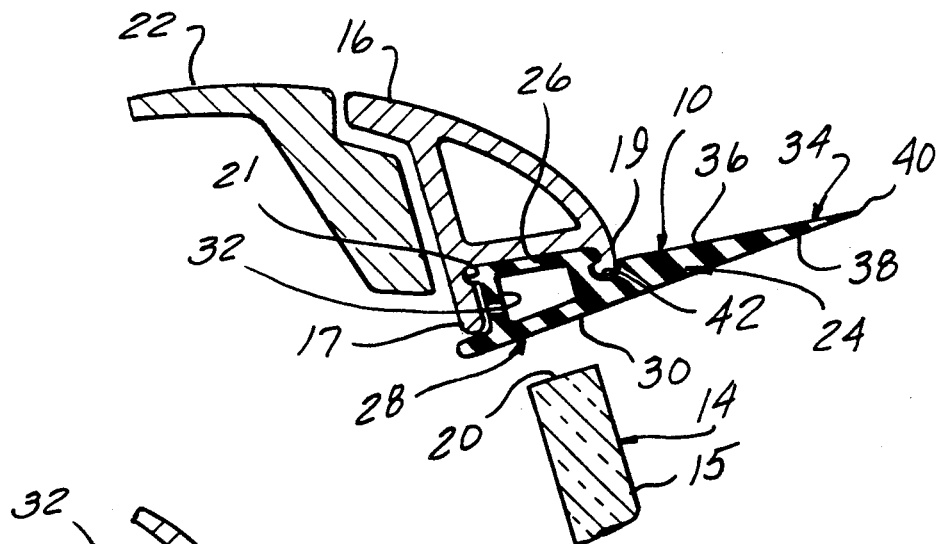
FIG. 2 is a cross sectional view generally taken along line 2—2 in FIG. 1 and showing one embodiment of the present invention with the window depicts in a partially downward position.
Figure 3:
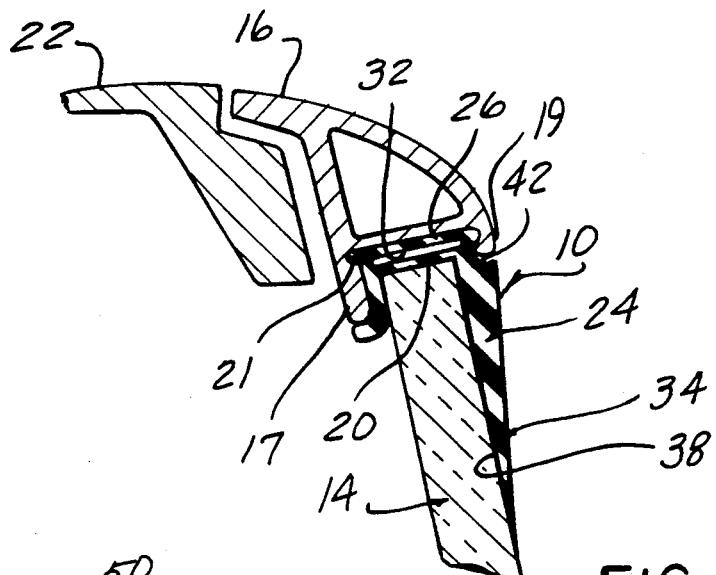
FIG. 3 is a cross sectional view generally similar to FIG. 2; but showing the vehicle window in its fully raised position.

As shown in FIG. 1, and in greater detail in FIGS. 2 and 3, the window 14 is mounted in a suitable frame 16 within a door 18 and moves between a downward or retracted position fully opening the window opening 13 to a fully raised position closing the window opening 13 as shown in FIG. 3. The window 14 has a top edge 20 which engages the weatherstrip 10 when in the fully raised position.

The weatherstrip 10, as shown in detail in FIGS. 2 and 3, is mounted in the frame 16 on the vehicle 12. The frame 16 typically comprises rigid, interconnected members surrounding the top, front and rear portions of the window 14 and, in one typical application, is part of the door 18. The top and upper side portions of the frame 16 abut edges of the vehicle roof structure 22. It will be understood that the term "frame" as used in conjunction with the present weatherstrip 10 is meant to include any type of frame on a vehicle with which the window 14 closes into close proximity with when in the fully raised position. An alternate embodiment of a frame, such as a frame comprising only the side edge of a vehicle roof, will be described hereafter. Further, the frame 16 may be the solid vehicle body structure surrounding a rear window which is not mounted in a pivotal door.

As shown in FIGS. 2 and 3, the frame 16, in one typical embodiment, includes two spaced, depending side flanges 17 and 19 which form a channel therebetween. An enlarged recess 21 is formed in the flanges 17 and 19 for receiving the weatherstrip 10, as described hereafter.

The weatherstrip 10 comprises a single piece body 24 made of a suitable flexible material, such as rubber, an elastomeric material, etc. The material for the weatherstrip 24 must exhibit flexibility so as to be able to conform to the top edge 20 of the window 14 when the window 14 engages the weatherstrip 10, as described hereafter.

As shown in FIGS. 2 and 3, the body 24 of the weatherstrip 10 includes a frame mounting portion or surface denoted in general by reference number 26. The frame mounting portion 26 has a shape complimentary to the shape of the frame 16 on the vehicle 12 so as to be secured thereto by suitable means. Such securing means include the use of adhesives as well as a deformable metal clip imbedded in the weatherstrip, as described hereafter in conjunction with FIG. 4. By way of example only, the frame mounting portion 26 includes a pair of outwardly extending ears 27 which forcibly engages the recesses 21 in flanges 17 and 19 of the frame 16 to secure the weatherstrip 10 to the frame 16 in a snap-in fit.

The body 24 of the weatherstrip 10 also includes a deformable portion denoted in general by reference number 28. The deformable portion 28 is deformable upward upon engagement with the top edge 20 of an upwardly movable window 14 and deforms under such engagement. As shown in FIG. 2, the deformable portion 28 includes a window engaging surface 30 which is spaced from the inner portions of the frame 16 in which the weatherstrip 10 is mounted.

In one embodiment of the present weatherstrip 10 shown in FIGS. 2 and 3, the deformable portion 28 of the body 24 of the weatherstrip 10 includes a hollow internal channel 32 which runs the length of the body 24. As shown in FIG. 1, the weatherstrip 10 extends from a front end adjacent the lower edge of the windshield to a rear end adjacent the upper rear corner of the door 18. The channel 32 is formed between the window engaging surface 30 and the frame engaging surface 26 of the deformable portion 28 of the body 24. The channel 32 allows for deformation of the window engaging surface 30 of the deformable portion 28 toward the frame 16 as the top edge 20 of the window 14 engages the window engaging surface 30 of the weatherstrip 10 and continues its upward movement into proximity with the frame 16.

Such deformation of the deformable portion 28 of the body 24 is translated into pivotal movement of a lip 34 which is integrally formed with and extends outward from the deformable portion 28 and the frame mounting portion 26 of the body 24 of the weatherstrip 10. By way of example only, the lip 34 is formed with an upper surface 36 and a lower or bottom surface 38 both of which taper from ends integral with the deformable portion 28 of the body 24 to an apex or leading edge 40.

It should be noted that the lip 34 of the body 24 extends outward a short distance, as shown in FIG. 2, beyond the vehicle frame 16 and beyond the exterior surface 15 of the window 14. This enables the lip 24, when in the horizontal or slightly upwardly inclined position shown in FIG. 2, to act as a rain channel or gutter in conjunction with the adjacent portion of the vehicle frame 16 to divert water flowing off of the vehicle roof 22 and the vehicle frame 16 away from the window opening 13 when the window 14 is not in the fully raised position, as shown in FIG. 2. By way of example only, the lip 34 has a length of approximately one inch measured from its outer leading edge 40 to its juncture with the deformable portion 28.

A recess 42 is formed in the body 24 intermediate the frame engaging portion 26 and the lip 34 to aid in mounting the body 24 to the vehicle frame 16 as well as enhancing the pivotal movement of the lip 34 from the outwardly extending position shown in FIG. 2 to a substantially downward extending position shown in FIG. 3.

In operation, when the vehicle window 14 is not in the fully raised position, but is spaced from the vehicle frame 16, as shown in FIG. 2, the weatherstrip 10 assumes a normal, relaxed position with the lip 34 extending outward from the vehicle frame 16 beyond the exterior surface 15 of the window 14. However, upon upward movement of the window 14 to the fully raised position as shown in FIG. 3, the top edge 20 of the window 14 engages the window engaging surface 30 on the deformable portion 28 of the weatherstrip body 24 and deforms the deformable portion 24 so as to urge the window engaging surface 30 toward the frame engaging surface 26 mounted on the vehicle frame 16. This collapses the deformable portion 28 and causes a pivotal movement of the lip 34 substantially about the recess 42 which results in a downward pivotal movement of the lip 34 to a substantially downward extending position in which the bottom surface 38 of the lip 34 is in substantial contact or registry with the exterior surface 15 of the window 14. In this position, the lip 34 seals the exterior of the top edge of the window 14 and prevents the entry of air and water into the passenger compartment of the vehicle 12. The lip 34 in its downwardly extending position shown in FIG. 3 also presents a reduced cross section to minimize wind noise and drag during movement of the vehicle 12.

Figure 4:
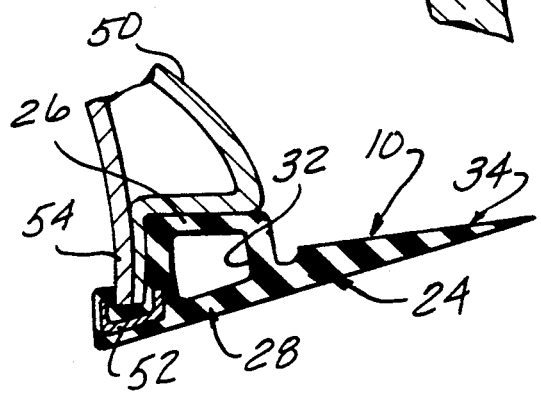
FIG. 4 is a cross sectional view generally similar to FIG. 2; but showing an alternate embodiment of the present invention.

Another embodiment of the present invention is shown in FIG. 4 in which the vehicle frame is denoted by reference number 50. In this embodiment, the vehicle frame 50 comprises the side edge of the vehicle roof structure which overlays the upper portion of the vehicle window, not shown. The frame 50 surrounds its top, front and rearmost edges of the window as is typical for rear side windows on two door vehicles. The weatherstrip 10 may be mounted to the frame 50 by attaching the frame engaging portion 26 to a channel or edge on the frame 50 as shown in FIG. 4 by means of an adhesive. Alternately, a deformable wire clip 52 may be embedded within a flange portion of the weatherstrip body 24 and forced into engagement with a flange 54 on the vehicle roof structure 50 to retain the weatherstrip 10 in position above the vehicle window. However, the weatherstrip 10 in the embodiment shown in FIG. 4 functions in the same manner as that described above and shown in FIGS. 2 and 3 in that the lip 34 will pivot downward into sealing engagement with the top exterior edge of the window 14 as the window 14 moves upwardly toward its fully raised position deforming the deformable portion 28 of the weatherstrip body 24.

Figure 5:
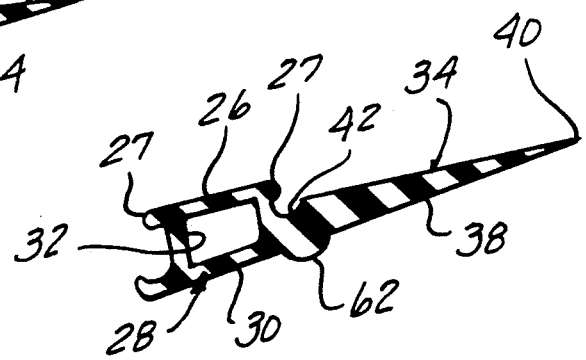
FIG. 5 is a cross sectional view showing another embodiment of the present invention.

FIG. 5 depicts another embodiment of the weatherstrip seal which is denoted by reference number 60. In this embodiment, the weatherstrip 60 is substantially identical to the weatherstrip 10 described above and shown in FIGS. 2-4 except for the inclusion of an enlarged boss 62 or projection which is formed in the weatherstrip body 24 intermediate the lip 34 and the deformable portion 28. As shown in FIG. 5, the boss 64 projects outwardly between the bottom surface 38 of the lip 34 and the window engaging surface 30 of the deformable portion 28 of the weatherstrip 60. The boss 62 is squeezed between the top edge 20 of the window 14 and the vehicle frame as the window 14 moves upwardly to its fully raised position thereby generating a twisting movement which imparts a downward force on the apex or leading edge 40 of the lip 34 of the weatherstrip 60 to retain the lip 34 in a tight, sealed contact with the exterior surface 15 of the window 14.

Figure 6:
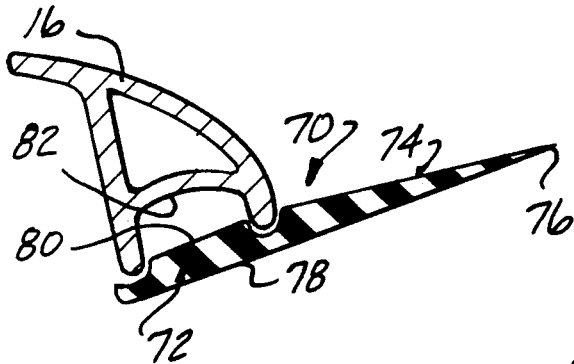
FIG. 6 is a cross sectional view showing yet another embodiment of the present invention.

Another embodiment of the weatherstrip of the present invention is shown in FIG. 6 in which the weatherstrip 70 lacks the channel 32 formed in the weatherstrip 10 as described above. The deformable portion 72 of the weatherstrip 70 comprises a solid body portion in the weatherstrip body integrally formed with an outwardly extending lip 74 which terminates in an apex or leading edge 76. The weatherstrip 70 is secured to the vehicle frame 16 by any suitable means, such as the wire clip 52 shown in FIG. 4 and described above or by other suitable and conventional means. A window engaging surface 78 is formed on one side of the deformable portion 72. The opposite side 80 of the deformable portion 72 is spaced from the inner surface 82 of the vehicle frame 16 when the weatherstrip 70 is in its normal, relaxed position as shown in FIG. 6. This surface 80 is urged toward the inner surface 82 of the vehicle frame 16 when the window 14 engages the window engaging surface 78 and deforms the deformable section 72 into the channel portion 82 of the vehicle frame 16. As described for other embodiments of the weatherstrip of the present invention, such deformation of the deformable portion 72 of the weatherstrip 70 causes a downward, clockwise pivotal movement of the lip 72 to bring the lip 72 into engagement with the top exterior surface of the vehicle window 14.

Figure 8:
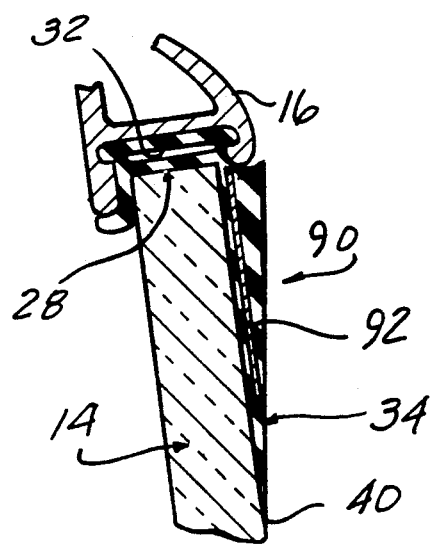
FIG. 8 is a partial cross sectional view showing the weatherstrip seal depicted in FIG. 7 in its downward position when the vehicle window is fully raised.
Figure 7:
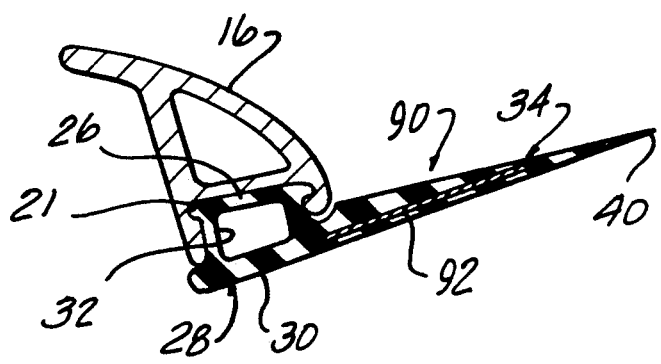
FIG. 7 is a cross sectional view showing another embodiment of the present invention in its normal extended position.

As shown in FIGS. 7 and 8, another embodiment of the weatherstrip 90 is depicted which is substantially identical to the weatherstrip 10 shown in FIGS. 2 and 3 and described above. In this embodiment, however, the weatherstrip 90 includes a thin, planar reinforcement strip 92 which is disposed within the interior of the lip 34 of the weatherstrip 90. The planar strip 92 has one end spaced a short distance from the apex or leading edge 40 of the lip 34 and an opposite end which is located adjacent to the deformable portion 28 of the weatherstrip body. In this manner, when the lip 34 is pivoted to its downward position, as shown in FIG. 8, by the upward movement of the window 14 into the deformable portion 28 of the weatherstrip 90, the planar reinforcement strip 92 will extend only along the upper portion of the window 14.

The reinforcement strip 92 provides rigidity to the lip 34 when the lip 34 is in its outwardly extending position shown in FIG. 7. This prevents ripple or fluttering of the lip 34 which could create noise during movement of the vehicle. The reinforcement strip 92 also forcibly urges and retains the lip 34 into tight engagement with the upper edge of the exterior surface of the window 14 to enhance the sealing characteristics of the weatherstrip 90.

In summary, there has been disclosed a unique weatherstrip seal for a vehicle window which provides the dual functions of sealing the window when the window is in its fully raised position as well as acting as a rain channel or gutter in conjunction with the adjacent portion of the vehicle frame when the window is downward from its fully raised position. The weatherstrip seal of the present invention uniquely prevents the entry of water into the vehicle passenger compartment when the window is not in its fully raised position. However, such diversion of water from the interior passenger compartment is achieved without the use of additional, separate elements which are attached to the vehicle frame or roof structure as in prior rain gutter constructions. The weatherstrip seal of the present invention is formed with only a slight modification to existing weatherstrip seal designs thereby affording the above-described features at a low additional cost.

What is claimed is:

1. A vehicle window weatherstrip mountable in a vehicle having a frame surrounding at least a portion of an upwardly and downwardly movable window having an exterior surface, the weatherstrip comprising:
   a one-piece body having a frame mounting portion engageable with the vehicle frame for mounting the body to the frame;
   a movable lip integral with the frame mounting portion and extending outward from the frame beyond the exterior surface of the vehicle window to an outermost tip; and
   a deformable portion integral with the lip and deformable upward upon engagement with the top edge of an upwardly movable window, the deformable portion including a window edge engaging surface normally spaced from the vehicle frame when the window is downwardly spaced from the body and movable toward the frame under contact with the upwardly movable window;
   the window engaging surface of the deformable portion and a lower surface of the lip extending to the tip and defining a continuous, planar surface when in a normal position;
   the lip moving from a normal outwardly extending position defining a water channel with the adjacent portion of the vehicle frame when the deformable portion is in a normal, un-deformed position spaced from a downwardly positioned window to a downwardly extending position at least substantially in registry with the exterior surface of the window.

2. The weatherstrip of claim 1 wherein the body is formed of an flexible elastomeric material.

3. The weatherstrip of claim 1 wherein the deformable portion further comprises:
   a hollow channel formed in the body between the window engaging surface and a spaced, frame engaging surface.

4. The weatherstrip of claim 1 wherein:
   the lip is normally disposed at an upwardly extending angle from horizontal when the deformable portion of the body is in an un-deformed condition.

* * * * *